United States Patent
Tavallaei et al.

(10) Patent No.: US 9,513,620 B2
(45) Date of Patent: Dec. 6, 2016

(54) ULTRASONIC MOTOR CONTROL SYSTEM AND METHOD

(71) Applicant: VITAL BIOMEDICAL TECHNOLOGIES INC., London (CA)

(72) Inventors: Mohammad Ali Tavallaei, London (CA); Maria Drangova, London (CA)

(73) Assignee: Vital Biomedical Technologies Inc., Ontario (CA)

(*) Notice: Subject to any disclaimer, the term of this patent is extended or adjusted under 35 U.S.C. 154(b) by 332 days.

(21) Appl. No.: 14/225,199

(22) Filed: Mar. 25, 2014

(65) Prior Publication Data

US 2015/0270790 A1 Sep. 24, 2015

Related U.S. Application Data

(60) Provisional application No. 61/969,726, filed on Mar. 24, 2014.

(51) Int. Cl.
*G05D 23/275* (2006.01)
*G05B 19/404* (2006.01)
*H02N 2/14* (2006.01)

(52) U.S. Cl.
CPC ............ *G05B 19/404* (2013.01); *H02N 2/142* (2013.01)

(58) Field of Classification Search
CPC ........ H02N 2/142; H02N 2/062; H02N 2/008; H02N 2/14; H02N 2/001; H02N 2/0075; G05B 2219/39219; G05B 2219/42338; G05B 19/05; G05B 19/404; H01L 2224/85205
USPC .... 318/634, 641, 144, 117, 127, 128, 400.4, 318/471; 310/116, 315, 316.01, 316.02, 310/318, 323.17, 323.21, 68 C
See application file for complete search history.

(56) References Cited

U.S. PATENT DOCUMENTS

| | | | | | |
|---|---|---|---|---|---|
| 4,952,834 | A * | 8/1990 | Okada | ..... | H02N 2/14 310/316.02 |
| 5,258,694 | A * | 11/1993 | Ohnishi | ..... | H02N 2/003 310/316.02 |
| 5,365,139 | A * | 11/1994 | Kasuga | ..... | G04C 3/12 310/316.02 |
| 5,631,516 | A * | 5/1997 | Kataoka | ..... | H02N 2/14 310/316.02 |
| 6,215,223 | B1 * | 4/2001 | Furukoshi | ..... | H02N 2/14 310/316.01 |
| 6,437,481 | B2 * | 8/2002 | Senda | ..... | H02N 2/142 310/317 |
| 6,894,422 | B2 * | 5/2005 | Kato | ..... | H02N 2/142 310/323.03 |
| 6,984,919 | B2 * | 1/2006 | Iino | ..... | H02N 2/0075 310/316.01 |

(Continued)

*Primary Examiner* — Bentsu Ro
*Assistant Examiner* — Thai Dinh
(74) *Attorney, Agent, or Firm* — Dicke, Billig & Czaja, PLLC

(57) ABSTRACT

A method of controlling an ultrasonic motor coupled to a motor driver circuit, comprises receiving a temperature signal representing the temperature of the ultrasonic motor, receiving a position signal output by a first encoder representing the position of the ultrasonic motor, calculating an error between the position of the ultrasonic motor represented by the position signal and a target position, calculating a control signal based on the temperature of the ultrasonic motor represented by the temperature signal and the calculated error, and sending the control signal to the motor driver circuit to control the ultrasonic motor.

20 Claims, 4 Drawing Sheets

(56) References Cited

U.S. PATENT DOCUMENTS

| | | | |
|---|---|---|---|
| 8,253,370 B2* | 8/2012 | Araki | H02N 2/142 |
| | | | 318/799 |
| 9,344,012 B2* | 5/2016 | Tavallaei | H02N 2/001 |
| 2011/0164331 A1* | 7/2011 | Sugiyama | H02N 2/062 |
| | | | 359/823 |
| 2013/0207574 A1* | 8/2013 | Tavallaei | H02N 2/142 |
| | | | 318/116 |

* cited by examiner

ULTRASONIC MOTOR CONTROL SYSTEM AND METHOD

CROSS-REFERENCE TO RELATED APPLICATIONS

This application claims the benefit of U.S. Provisional Application No. 61/969,726 to Drangova et al. filed on Mar. 24, 2014, the entire disclosure of which is incorporated herein by reference.

FIELD

The subject application relates generally to control systems and in particular, to an ultrasonic motor control system and method.

BACKGROUND

Ultrasonic motors are known in the art and are powered by the ultrasonic vibration of a stator placed against the rotor or slider depending on the scheme of operation, namely rotation or linear translation. Resonance is used to amplify the vibration of the stator in contact with the rotor or slider.

One particular challenge with ultrasonic motors is that the friction power loss, structure dampening power loss and dielectric power loss all result in temperature elevations of the ultrasonic motor. This temperature change significantly affects the performance characteristics of the ultrasonic motor and changes the resonance frequency of the piezoelectric material making accurate control of the ultrasonic motor challenging.

U.S. Pat. No. 5,365,139 to Kasuga et al. discloses an electronic apparatus which is equipped with an ultrasonic motor. A driving pulse storage circuit stores driving pulses corresponding to the environment of the components of the ultrasonic motor. A stopping pulse storage circuit stores stopping pulses corresponding to the environment of the components of the motor. An environment detection means detects the environment of the components. An output pulse-selecting circuit receives the output signal from a driving pulse-generating circuit and the output signal from a stopping pulse-generating circuit and produces output pulses corresponding to the output signal from a detection signal-generating circuit to a piezoelectric vibrator-driving circuit. The moving member and the output means are operated by ultrasonic vibration of the vibrating member.

U.S. Pat. No. 5,258,694 to Ohnishi et al. discloses a control device for an ultrasonic motor for controlling to drive the ultrasonic motor according to a logical AND operation between a control pulse having a duty ratio changing from 100% to 0% according to a moving position of the ultrasonic motor and a driving signal having a resonance frequency of the ultrasonic motor. Accordingly, after starting the ultrasonic motor at a maximum speed, a moving speed of the ultrasonic motor can be gradually reduced until it reaches a target position, and when reaching the target position, the ultrasonic motor can be stopped precisely at the target position.

U.S. Pat. No. 6,894,422 to Kato discloses an ultrasonic-motor control system that includes an ultrasonic motor, a controller which starts the ultrasonic motor by changing a drive frequency of the ultrasonic motor from an initial drive frequency, a calculation device which calculates an initial drive frequency data based on a drive frequency at the commencement of rotation of the ultrasonic motor, and a setting device which sets the initial drive frequency based on the initial drive frequency data at a subsequent commencement of driving of the ultrasonic motor.

Although control systems for ultrasonic motors are known, improvements are desired. It is therefore an object to provide a novel ultrasonic motor control system and method.

SUMMARY

Accordingly, in one aspect there is provided a method of controlling an ultrasonic motor coupled to a motor driver circuit, comprising receiving a temperature signal representing the temperature of the ultrasonic motor, receiving a position signal output by a first encoder representing the position of the ultrasonic motor, calculating an error between the position of the ultrasonic motor represented by the position signal and a target position, calculating a control signal based on the temperature of the ultrasonic motor represented by the temperature signal and the calculated error, and sending the control signal to the motor driver circuit to control the ultrasonic motor.

According to another aspect there is provided a system for controlling an ultrasonic motor coupled to a motor driver circuit comprising a first encoder coupled to the ultrasonic motor, a temperature sensing module configured to obtain a temperature of the ultrasonic motor, and processing structure configured to receive a temperature signal from the temperature sensing module representing the temperature of the ultrasonic motor, receive a position signal output by the first encoder representing the position of the ultrasonic motor, calculate an error between the position of the ultrasonic motor represented by the position signal and a target position, calculate a control signal based on the temperature of the ultrasonic motor represented by the temperature signal and the calculated error, and send the control signal to the motor driver circuit to control the ultrasonic motor.

According to yet another aspect there is provided a non-transitory computer readable medium embodying a computer program having computer program code for execution by a computer to perform a method of controlling an ultrasonic motor coupled to a motor driver circuit, the method comprising receiving a temperature signal representing the temperature of the ultrasonic motor, receiving a position signal output by a first encoder representing the position of the ultrasonic motor, calculating an error between the position of the ultrasonic motor represented by the position signal and a target position, calculating a control signal based on the temperature of the ultrasonic motor represented by the temperature signal and the calculated error, and sending the control signal to the motor driver circuit to control the ultrasonic motor.

BRIEF DESCRIPTION OF THE DRAWINGS

Embodiments will now be described more fully with reference to the accompanying drawings in which.

DETAILED DESCRIPTION OF EMBODIMENTS

Figure 1:
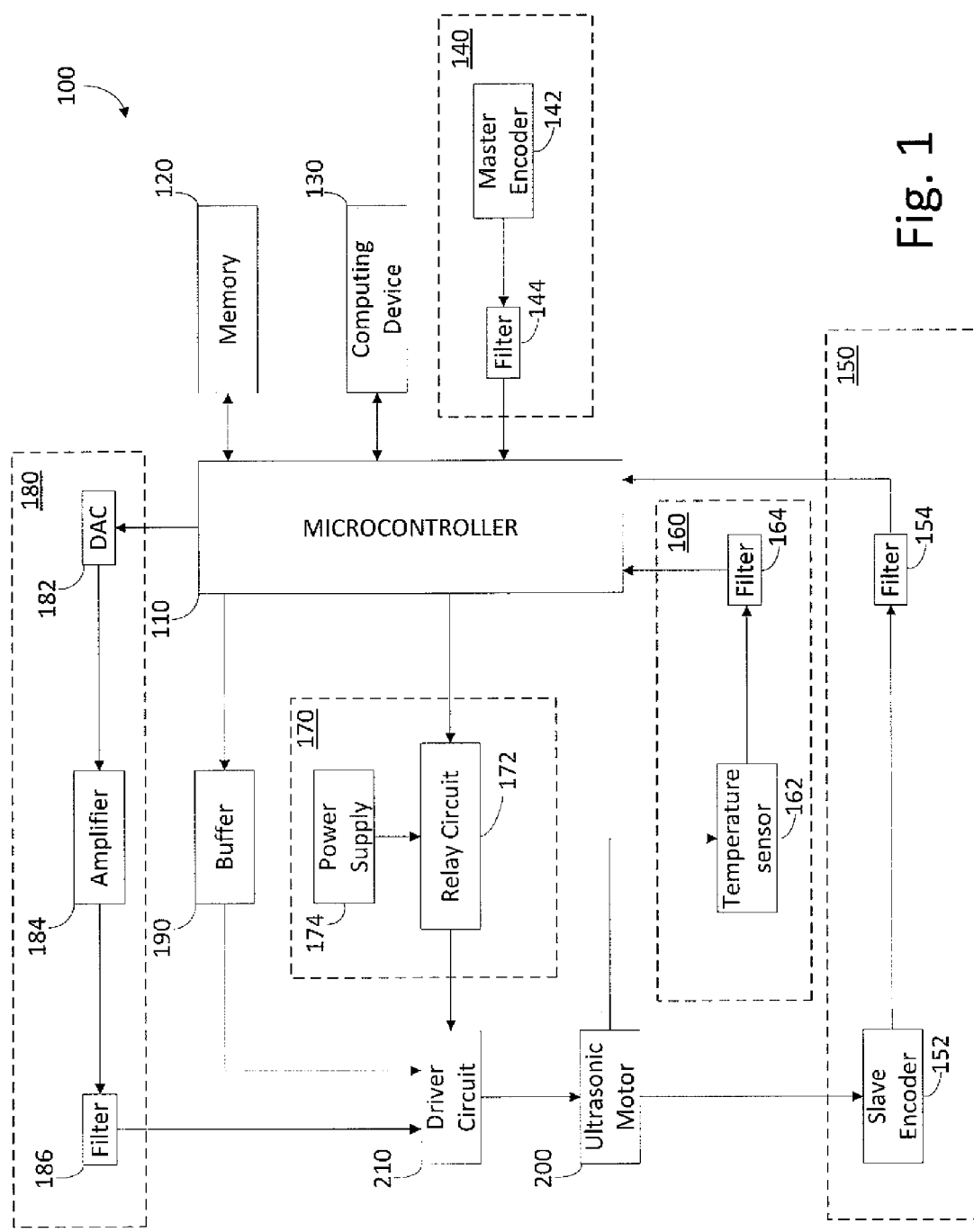
FIG. 1 is a schematic block diagram of an ultrasonic motor control system.

Turning now to FIG. 1, a schematic block diagram of an ultrasonic motor control system is shown and is generally identified by reference numeral 100. As can be seen, the ultrasonic motor control system 100 comprises a microcontroller 110 coupled to memory 120, a general purpose computing device 130, a master encoder module 140, a slave encoder module 150, a temperature sensing module 160, a relay module 170, an output conditioning module 180 and a buffer 190. An ultrasonic motor 200 is coupled to the slave encoder module 150, the temperature sensing module 160, and a motor driver circuit 210. The motor driver circuit 210 is coupled to the relay module 170, the output conditioning module 180 and the buffer 190.

The microcontroller 110 in this embodiment is an 8-bit microcontroller such as that manufactured by ATMEL™ of San Jose, Calif. running at a clock frequency of 32 MHz. The microcontroller 110 executes a method of controlling the operation of the ultrasonic motor 200, as will be described below.

The memory 120 in this embodiment is flash memory and is used to store data for use by the microcontroller 110.

The general purpose computing device 130 bi-directionally communicates with the microcontroller 110. In this embodiment, the general purpose computing device 130 is a personal computer or other suitable processing device comprising, for example, a processing unit comprising one or more processors, system memory (volatile and/or non-volatile memory), other non-removable or removable memory (e.g. a hard disk drive, RAM, ROM, EEPROM, CD-ROM, DVD, flash memory, etc.) and a system bus coupling the various computer components to the processing unit. The general purpose computing device 130 may also comprise networking capabilities using Ethernet, WiFi, and/or other network formats, to enable access to shared or remote drives, one or more networked computers, or other networked devices. The general purpose computing device 130 is also coupled to a display monitor (not shown).

The master encoder module 140 comprises a master encoder 142 that is coupled to a master device (not shown), which in this embodiment is a joystick. The master encoder 142 is also coupled to a filter 144, which itself is coupled to the microcontroller 110. In this embodiment, the master encoder 142 is an optical encoder. The master encoder module 140 communicates a position signal representing the position of the master device to the microcontroller 110.

The slave encoder module 150 comprises a slave encoder 152 that is coupled to the ultrasonic motor 200. The slave encoder 152 is also coupled to a filter 154, which itself is coupled to the microcontroller 110. In this embodiment, the slave encoder 152 is an optical encoder. The slave encoder module 150 communicates a position signal representing the position of the ultrasonic motor 200 to the microcontroller 110.

The temperature sensing module 160 comprises a temperature sensor 162 that monitors the temperature of the ultrasonic motor 200. The temperature sensor 162 is also coupled to a filter 164, which itself is coupled to the microcontroller 110. In this embodiment, the temperature sensor 162 is a thermistor having digital readout such as for example a Maxim Integrated™ MAX6576 sensor manufacture by Maxim Integrated™ of San Jose, Calif. The temperature sensing module 160 communicates a temperature signal representing the temperature of the ultrasonic motor 200 to the microcontroller 110.

The relay module 170 comprises a relay circuit 172 coupled to a power supply 174, the motor driver circuit 210 and the microcontroller 110. The relay module 170 is used to control the power supplied to the motor driver circuit 210. In this embodiment, a control bit is received by the relay circuit 172 from the microcontroller 110 and is used to turn on or off the relay circuit 172. As a result the relay circuit 172 selectively provides power to the motor driver circuit 210 and thus, selectively controls the operation of the ultrasonic motor 200. The relay module 170 allows for complete shutdown of the ultrasonic motor 200 for various purposes such as for example thermal protection, fast breaking, and preventing jitters.

The output conditioning module 180 comprises a digital-to-analogue (DAC) converter 182 coupled to an amplifier 184 and to the microcontroller 110. The amplifier 184 is coupled to a filter 186, which itself is coupled to the motor driver circuit 210. The DAC 182 receives a control signal from the microcontroller 110 and converts the control signal to an analogue control signal. The analogue control signal is passed through the amplifier 184 and the filter 186 before being fed to the motor driver circuit 210 to remove jitters and to ensure continuous transition of the analogue control signal.

The buffer 190 receives a direction bit from the microcontroller 110, converts the direction bit to the appropriate current and voltage level to ensure current and voltage compatibility and sends the converted direction bit to the motor driver circuit 210. In this embodiment, the buffer 190 is a voltage level translator coupled to a rail-to-rail op-amp having unity feedback. The buffer 190 receives the direction bit at 3 volts wherein the level is translated to 5 volts by the voltage level translator.

The ultrasonic motor 200 in this embodiment is of the type such as that manufactured by Fukoku-Shinsei of Tokyo, Japan under the part number USR60-NM. The ultrasonic motor 200 receives signals from the motor driver circuit 210 and operates based on the received signals.

As mentioned above, the motor driver circuit 210 receives the analogue signal from the output conditioning module 180 and processes the received analogue signal to obtain frequency, amplitude and/or phase variation values, which are used to control the speed of the ultrasonic motor 200. The motor driver circuit 210, which also receives the direction bit from the buffer module 190, uses the direction bit to control the direction of rotation of the ultrasonic motor 210. The motor driver circuit 210 is powered by the relay module 170.

The general operation of the control system 100 will now be described. The temperature sensing module 160 monitors the temperature of the ultrasonic motor 200 and communicates a temperature signal to the microcontroller 110. The microcontroller 110 receives a position signal from the master encoder module 140 representing the position of the master device, which is used as a target position. The microcontroller 110 receives a position signal from the slave encoder module 150 representing the position of the ultrasonic motor 200. The microcontroller 100 uses the received position signals to calculate an error between the position of the ultrasonic motor 200 and the target position. The temperature signal and calculated error are then used by the microcontroller 110 to calculate a control signal. The control signal is then communicated to the motor driver circuit 200 to control the ultrasonic motor 200 such that is tracks movement of the master device.

Figure 2:
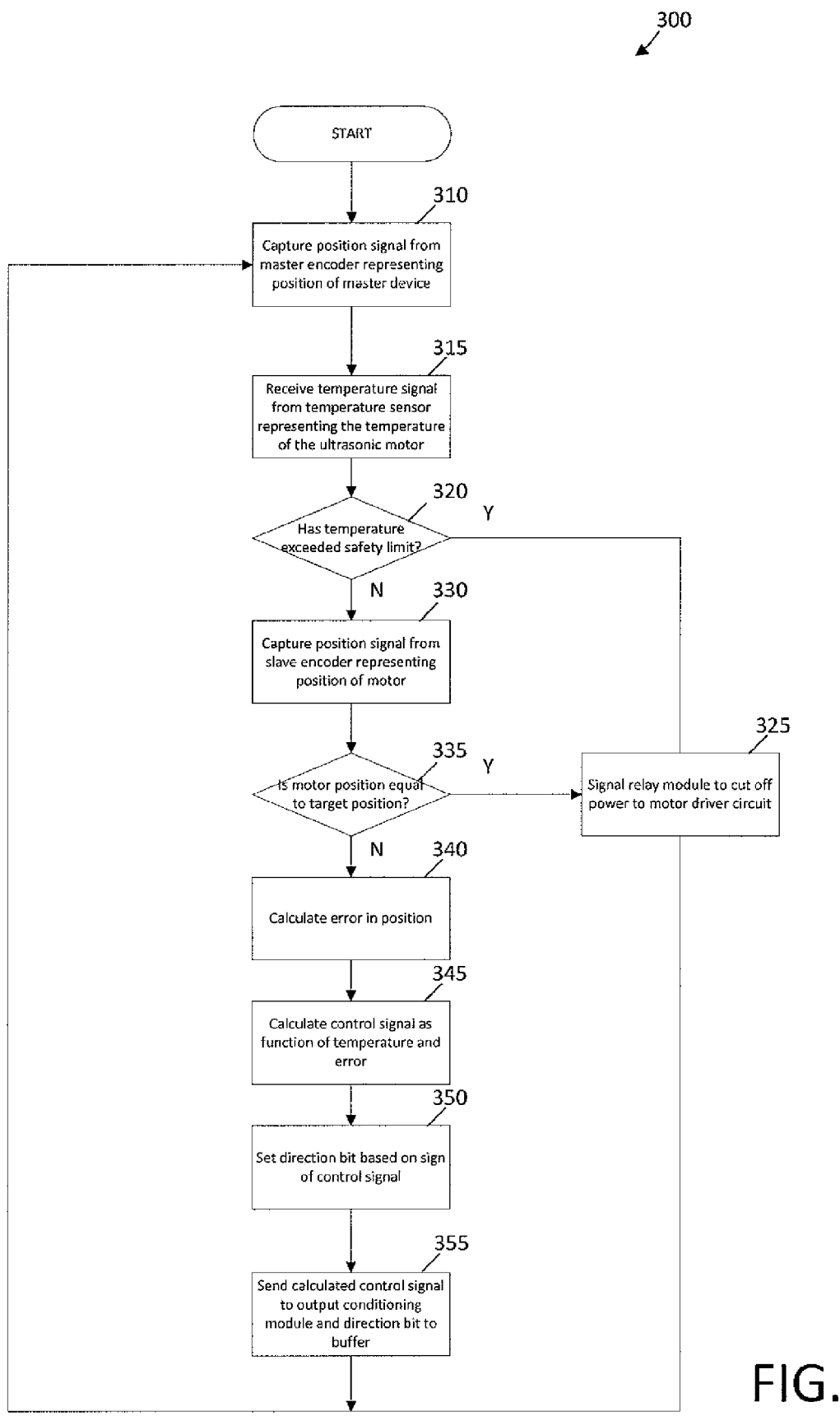
FIG. 2 is a flowchart showing a method of controlling an ultrasonic motor executed by a processor forming part of the ultrasonic motor control system of FIG. 1.

FIG. 2 better illustrates the method 300 performed by the microcontroller 110 during processing of the temperature and position data received from the temperature sensing module 160, the master encoder module 140 and the slave encoder module 150. The position signal output by the master encoder module 140 representing the position of the master device is received by the microcontroller 110, and is set as a target position (step 310).

The temperature signal output by the temperature sensing module 160 representing the temperature of the ultrasonic motor 200 is received by the microcontroller 110 (step 315). In this embodiment, the temperature signal is in the form of a square wave having a frequency proportional to the temperature of the ultrasonic motor 200. The temperature signal is processed by the microcontroller 110 to determine the temperature of the ultrasonic motor 200.

A check is performed to determine if the temperature of the ultrasonic motor 200 has exceeded a safety threshold (step 320). If the temperature of the ultrasonic motor 200 has exceeded the safety threshold, the microcontroller 110 communicates a signal to the relay circuit 172 to cut off power to the motor driver circuit 210, thereby shutting down the ultrasonic motor 200 (step 325) and the method returns to step 310.

If, at step 320, the temperature of the ultrasonic motor 200 has not exceeded the safety threshold, the position signal output by the slave encoder module 150 representing the position of the ultrasonic motor 200 is received by the microcontroller 110 (step 330). The position of the ultrasonic motor 200 is compared to the target value (step 335). If the position of the ultrasonic motor 200 is equal to the target position, the method continues to step 325 wherein the microcontroller 100 communicates a signal to the relay circuit 172 to cut off power to the motor driver circuit 210, thereby shutting down the ultrasonic motor 200. If, at step 335, it is determined that the position of the ultrasonic motor 200 is not equal to the target position, the position signal representing the position of the ultrasonic motor 200 is compared to the target position to calculate an error e(t). The error e(t) represents the difference between the position of the ultrasonic motor 200 and the target position (step 340).

The microcontroller 110 then calculates a control signal to control the ultrasonic motor 200. The control signal is based on the error e(t), as calculated in step 340 and the temperature of the ultrasonic motor 200, as determined in step 315. In this embodiment, the control signal is calculated according to Equation (1) (step 345):

$$u = (K_p + g_1(T))e(t) + (K_d + g_2(T))\frac{de(t)}{dt} + (K_i + g_3(T))\int_0^t e(\tau)d\tau \quad (1)$$

where $K_p$ is the proportional gain of the controller, t is time, T is the temperature of the ultrasonic motor 200, e(t) is the error in the ultrasonic motor position, $K_d$ is the derivative gain of the microcontroller 110, $K_i$ is integral gain of the microcontroller 110, and $g_1(T)$, $g_2(T)$ and $g_3(T)$ are gain turners. In this embodiment, $K_p=30$, $K_i\approx0$, $K_d=5$, $g_1(T)=6T$, $g_2(T)=6T$ and $g_3(T)=3T$.

The microcontroller 110 then sets the direction bit based on the sign of the control signal (step 350). That is, the direction bit is based on whether the control signal is positive or negative. In this embodiment, if the control signal is positive the direction bit is set to indicate a clockwise direction of rotation. If the control signal is negative the direction bit is set to indicate a counter clockwise direction of rotation. Of course, those of skill in the art will appreciate that a positive control signal may be used to set the direction bit to indicate a counter-clockwise direction of rotation and a negative control signal may be used to set the direction bit to indicate a clockwise direction of rotation. The calculated control signal is communicated to output conditioning module 180 and the direction bit is communicated to the buffer module 190 (step 355) and the method returns to step 310.

As mentioned previously, the output conditioning module 180 converts the control signal to an analogue signal using the DAC 182, and the resultant analogue signal is amplified by the amplifier 184 and filtered via the filter 186 to reduce jitters that may be present. The filtered analogue signal is communicated to the motor driver circuit 210. The buffer module 190 converts the direction bit to the appropriate current and voltage level and communicates the converted direction bit to the motor driver circuit 210.

The motor driver circuit 210 determines the direction of rotation of the ultrasonic motor 200 from the direction bit. The motor driver circuit 210 converts the filtered analogue signal to a frequency value using a voltage to frequency converter. The motor driver circuit 210 outputs two sinusoidal waves to the ultrasonic motor 200. The phase difference between the two sinusoidal waves is representative of the direction of rotation of the ultrasonic motor 200. The frequency of the two sinusoidal waves is proportional to the speed of the ultrasonic motor 200. As a result, the ultrasonic motor 200 is adjusted.

Although in the embodiment above the microcontroller of the ultrasonic motor control system is described as employing method 300 to control the operation of the ultrasonic motor, those skilled in the art will appreciate that the microcontroller of the ultrasonic motor control system may be used with other control methods. In another embodiment, the microcontroller may be used to produce an approximate model of the ultrasonic motor relating the temperature of the ultrasonic motor and the speed dynamics of the ultrasonic motor. In this embodiment, Equations (2) and (3) are used to calculate the system dynamics:

$$\ddot{\theta}=f(\theta,\dot{\theta},T,u) \quad (2)$$

$$\dot{T}=g(\dot{\theta},T,u) \quad (3)$$

where $\theta, \dot{\theta}$ and $\ddot{\theta}$ are the angle, angular velocity and angular acceleration of the ultrasonic motor, respectively, T is the temperature of the ultrasonic motor, $\dot{T}$ is the derivative of the temperature and u is the applied control voltage to the motor driver circuit. In this embodiment, the parameters of the model f and g are estimated and validated through identification experiments. A model based control such as for example a robust inverse dynamic controller or adaptive inverse dynamic controller may be implemented to calculate the control signal u to control the output angle θ or angular velocity $\dot{\theta}$. To follow a desired motion trajectory $\theta_d$, the desired motion trajectory $\theta_d$, the feedback of the executed motion trajectory (θ, $\dot{\theta}$) and the system dynamics model (calculated from equations 2 and 3) are used to calculate the control signal. As a result, the ultrasonic motor is controlled to follow the desired motion trajectory.

Although in embodiments described above the target position is described as being based on the position of the master device, those skilled in the art will appreciate that the target device may be based on other criteria. For example, in another embodiment, the target position may be retrieved from a reference trajectory vector stored in memory. In this embodiment, the target position may be obtained by the microcontroller using an interrupt service routine and a quadrature incremental encoder. The interrupt service routine may be evoked by a signal from one of the channels of the quadrature incremental encoder. During the interrupt service routine, the direction of rotation of the ultrasonic motor may be determined based on the phase of the two channels and the position information may be incremented or decremented based on the specified direction. Once the target position is received, the index of the reference trajectory vector may be incremented.

Although in embodiments described above the control system is described as utilizing a microcontroller, those skilled in the art will appreciate that other types of processing devices may be used such as for example a field programmable gate array (FPGA), an application-specific integrated circuit (ASIC) or a general purpose computing device having external ports and memory peripherals.

Although in embodiments described above the temperature sensor is described as being a thermistor in the form of a Maxim sensor, those skilled in the art will appreciate that other types of temperature sensors may be used. For example, infrared or semiconductor-type temperature sensors may be employed.

Although in Equation (1) the error is described as being the error in the ultrasonic motor's position, those skilled in the art will appreciate that in another embodiment the error may be set as the error in the ultrasonic motor's speed.

Although in embodiments described above, the ultrasonic motor control method utilizes the temperature of the ultrasonic motor, those skilled in the art will appreciate that the temperature may be used to control the operation of the ultrasonic motor in other ways. For example, the temperature may be used to ensure that the ultrasonic motor is operating within a temperature threshold such that the temperature does not exceed a particular limit which may cause damage.

Using the foregoing specification, the above described method of controlling the operation of the ultrasonic motor may be implemented using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, functionality may be imparted on a physical device as a computer program existent as instructions on any computer-readable medium such as on any memory device, that are to be executed by a processor. Examples of memory devices include, hard disk drives, diskettes, optical disks, magnetic tape, semiconductor memories such as FLASH, RAM, ROM, PROMS, and the like.

Using the description provided herein, those skilled in the art will be readily able to combine software created as described with appropriate general purpose or special purpose computer hardware to create a computer system and/or computer subcomponents for carrying out the method.

The above disclosure generally describes an system and method of controlling an ultrasonic motor. A more complete understanding can be obtained by reference to the following specific examples. These examples are provided solely for purpose of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

Example 1

Figure 3:
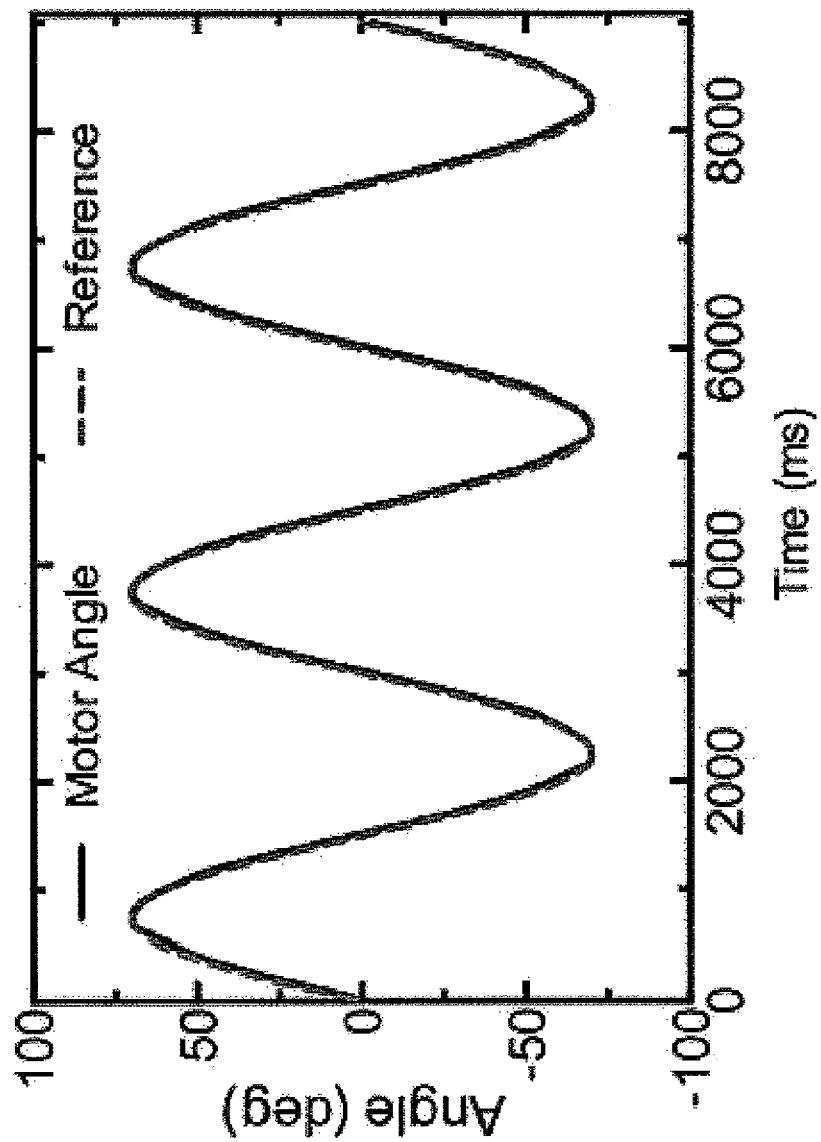
FIG. 3 is a graph showing ultrasonic motor output angle versus input reference signal.

The control system was implemented as a temperature dependent proportional-integral-derivate (PID). FIG. 3 is a graph showing ultrasonic motor output angle versus input reference signal. The angle of the ultrasonic motor was measured from the slave encoder. As can be seen in FIG. 3, the reference trajectory and the angle of the ultrasonic motor recorded from the slave encoder approximately overlap throughout the three cycles.

Example 2

Figure 4:
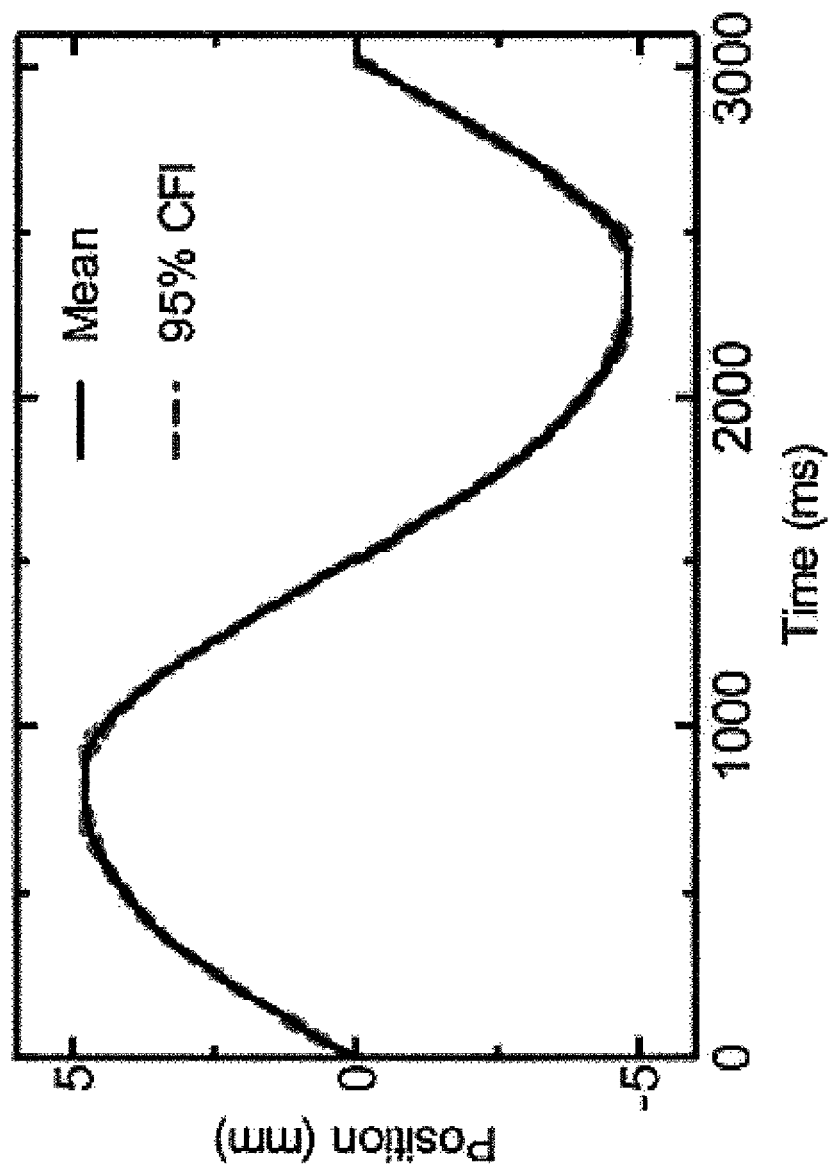
FIG. 4 is a graph showing the 95% confidence interval and the mean position of a carriage controlled by the ultrasonic motor control system of FIG. 1 captured for one hundred cycles of continuous operation.

The ultrasonic motor was used to drive a carriage of a linear motion stage. The ultrasonic motor produced a sinusoidal trajectory on the carriage with a period of 3 seconds and an amplitude of 5 mm. The position of the carriage was tracked using an optical tracking system (Polaris NDI, Canada). FIG. 4 is a graph showing the 95% confidence interval and the mean position of the carriage controlled by the ultrasonic motor control system captured for one hundred cycles of continuous operation. As can be seen, the performance of the ultrasonic motor control system was generally consistent throughout the one hundred cycles even though the temperature of the ultrasonic motor increased from approximately 23° C. to approximately 38° C. by the end of the one hundred cycles.

Although embodiments have been described above with reference to the accompanying drawings, those of skill in the art will appreciate that variations and modifications may be made without departing from the scope thereof as defined by the appended claims.

What is claimed is:

1. A method of controlling an ultrasonic motor coupled to a motor driver circuit, comprising:
   receiving a temperature signal representing the temperature of the ultrasonic motor;
   in the event that the temperature of the ultrasonic motor is within a temperature threshold:
      obtaining a position of a first encoder coupled to the ultrasonic motor;
      obtaining a dynamic target position;
      calculating an error between the position of the first encoder and the dynamic target position;
      calculating a control signal using a dynamic model of the ultrasonic motor and the motor driver circuit and the calculated error; and
      sending the calculated control signal to the motor driver circuit to adjust the position of the first encoder; and
   repeating the receiving, obtaining, calculating and sending until the calculated error is equal to zero or the temperature of the ultrasonic motor is not within the temperature threshold.

2. The method of claim 1 further comprising sending a control signal to the motor driver circuit to shut the ultrasonic motor off in the event that the temperature of the ultrasonic motor is not within the temperature threshold.

3. The method of claim 1 comprising determining a direction of the ultrasonic motor based on a sign of the calculated control signal.

4. The method of claim 3 wherein in the event that the sign of the calculated control signal is negative, the control signal adjusts the direction of the ultrasonic motor to be counter clockwise.

5. The method of claim 1 wherein the dynamic target position is based on a position of a second encoder.

6. The method of claim 5 wherein the position of the second encoder is based on a position of a master device.

7. The method claim 1 wherein the dynamic target position is based on a reference trajectory vector stored in memory.

8. The method of claim 1 wherein calculating the control signal is also based on the temperature of the ultrasonic motor.

9. The method of claim 1 wherein the dynamic model of the ultrasonic motor and the motor driver circuit generates the control signal using one of a robust inverse dynamic controller and an adaptive proportional-integral-derivative controller.

10. A system for controlling an ultrasonic motor coupled to a motor driver circuit comprising:
  a first encoder coupled to the ultrasonic motor;
  a temperature sensing module configured to obtain a temperature of the ultrasonic motor; and
  processing structure configured to:
    receive a temperature signal from the temperature sensing module representing the temperature of the ultrasonic motor, and in the event that the temperature of the ultrasonic motor is within a temperature threshold, the processing structure is configured to:
    obtain a position of the first encoder;
    obtain a dynamic target position;
    calculate an error between the position of the first encoder and the dynamic target position;
    calculate a control signal using a dynamic model of the ultrasonic motor and the motor driver circuit and the calculated error; and
    send the calculated control signal to the motor driver circuit to adjust the position of the first encoder; and
  repeat the receiving, obtaining, calculating and sending until the calculator error is equal to zero or the temperature of the ultrasonic motor is not within the temperature threshold.

11. The system of claim 10 wherein the processing structure is further configured to send a control signal to the motor driver circuit to shut the ultrasonic motor off in the event that the temperature of the ultrasonic motor is not within the temperature threshold.

12. The system of claim 10 wherein the processing structure is further configured to determine a direction of rotation of the ultrasonic motor based on a sign of the calculated control signal.

13. The system of claim 10 wherein the temperature sensing module comprises a temperature sensor.

14. The system of claim 13 wherein the temperature sensor is one of a thermistor, an infrared sensor, a thermistor and a semiconductor-type temperature sensor.

15. The system of claim 10 comprising a second encoder, wherein the dynamic target position is based on a position of the second encoder.

16. The system of claim 15 wherein the dynamic target position is based on the position of a master device coupled to the second encoder.

17. The system of claim 10 wherein the processing structure is configured to obtain the dynamic target position from a reference trajectory vector stored in memory.

18. The system of claim 10 wherein calculating the control signal is also based on the temperature of the ultrasonic motor.

19. The system of claim 10 wherein the dynamic model of the ultrasonic motor and the motor driver circuit generates the control signal using one of a robust inverse dynamic controller and an adaptive proportional-integral-derivative controller.

20. A non-transitory computer readable medium embodying a computer program having computer program code for execution by a computer to perform a method of controlling an ultrasonic motor coupled to a motor driver circuit, the method comprising:
  receiving a temperature signal representing the temperature of the ultrasonic motor;
  in the event that the temperature of the ultrasonic motor is within a temperature threshold:
    obtaining a position of a first encoder coupled to the ultrasonic motor;
    obtaining a dynamic target position;
    calculating an error between the position of the ultrasonic motor represented by first encoder and the dynamic target position;
    calculating a control signal using a dynamic model of the ultrasonic motor and the motor driver circuit and the calculated error; and
    sending the calculated control signal to the motor driver circuit to adjust the position of the first encoder; and
  repeating the receiving, obtaining, calculating and sending until the calculated error is equal to zero or the temperature of the ultrasonic motor is not within the temperature threshold.

* * * * *